United States Patent
Yang (10) Patent No.: US 12,464,527 B2
(45) Date of Patent: Nov. 4, 2025

(54) PARAMETER DETERMINING METHOD, INFORMATION CONFIGURATION METHOD, AND DEVICE

(71) Applicant: VIVO MOBILE COMMUNICATION CO.,LTD., Guangdong (CN)

(72) Inventor: Yu Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 326 days.

(21) Appl. No.: 17/574,748

(22) Filed: Jan. 13, 2022

(65) Prior Publication Data
US 2022/0141819 A1 May 5, 2022

Related U.S. Application Data

(63) Continuation of application No. PCT/CN2020/102801, filed on Jul. 17, 2020.

(30) Foreign Application Priority Data

Jul. 19, 2019 (CN) .......................... 201910657436.0

(51) Int. Cl.
*H04W 72/21* (2023.01)
*H04W 16/28* (2009.01)
(Continued)

(52) U.S. Cl.
CPC .......... *H04W 72/21* (2023.01); *H04W 16/28* (2013.01); *H04W 72/046* (2013.01); *H04W 72/0473* (2013.01); *H04W 72/23* (2023.01)

(58) Field of Classification Search
CPC ... H04W 72/21; H04W 16/28; H04W 72/046; H04W 72/0473; H04W 72/23;
(Continued)

(56) References Cited

U.S. PATENT DOCUMENTS

2019/0261338 A1* 8/2019 Akkarakaran ...... H04W 72/046
2019/0327743 A1 10/2019 Shi et al.
(Continued)

FOREIGN PATENT DOCUMENTS

CN 106301725 A 1/2017
CN 106686730 A 5/2017
(Continued)

OTHER PUBLICATIONS

3GPP TSG RAN WG1 #97; R1-1906225; Source: NTT Docomo, Inc.; Title: Discussion on multi-beam enhancement; Reno, USA, May 13-17, 2019 (Year: 2019).*
(Continued)

*Primary Examiner* — Mohammed S Chowdhury
(74) *Attorney, Agent, or Firm* — Price Heneveld LLP (57) ABSTRACT

This disclosure provides a parameter determining method, an information configuration method, and a device. The parameter determining method includes: in a case that a first preset condition is met, determining, based on parameter information of a specified object, a target parameter used in transmitting a PUCCH on a target physical uplink control channel PUCCH resource, where the specified object includes one of a specified resource, a specified channel, and a specified signal, and the target parameter includes at least one of spatial relation information and a power control parameter.

9 Claims, 3 Drawing Sheets

(51) Int. Cl.
*H04W 72/044* (2023.01)
*H04W 72/23* (2023.01)

(58) Field of Classification Search
CPC ... H04L 5/0053; H04L 5/0094; H04L 5/0023; H04L 1/1812; H04L 5/0055
See application file for complete search history.

(56) References Cited

U.S. PATENT DOCUMENTS

| | | |
|---|---|---|
| 2020/0068548 A1 | 2/2020 | Guan et al. |
| 2020/0119778 A1* | 4/2020 | Grant ................... H04B 7/0617 |
| 2020/0305088 A1 | 9/2020 | Nory et al. |
| 2021/0337453 A1* | 10/2021 | Gao ...................... H04B 7/0639 |
| 2022/0123872 A1* | 4/2022 | Zhang ................... H04L 5/0055 |
| 2022/0150926 A1* | 5/2022 | Mondal ............. H04W 72/1268 |
| 2022/0217754 A1* | 7/2022 | Matsumura ........... H04W 72/21 |
| 2022/0311577 A1* | 9/2022 | Matsumura ........... H04L 5/0035 |
| 2022/0321292 A1* | 10/2022 | Matsumura ........... H04W 72/23 |
| 2022/0330173 A1* | 10/2022 | Matsumura ........... H04L 5/0051 |
| 2022/0353046 A1* | 11/2022 | Matsumura ........... H04L 1/1854 |
| 2022/0377721 A1 | 11/2022 | Guan et al. |

FOREIGN PATENT DOCUMENTS

| | | |
|---|---|---|
| CN | 109803427 A | 5/2019 |
| JP | 2020533894 A | 11/2020 |
| WO | 2014182009 A1 | 11/2014 |
| WO | 2018126402 A1 | 7/2018 |
| WO | 2018204347 A1 | 8/2018 |
| WO | 2018228409 A1 | 12/2018 |
| WO | 2019028843 A1 | 2/2019 |
| WO | 2019049107 A1 | 3/2019 |
| WO | 2019137366 A1 | 7/2019 |

OTHER PUBLICATIONS

3GPP TSG RAN WG1 #97 Meeting; R1-1907317; Source: Nokia, Nokia Shanghai Bell; Title: Enhancements on Multi-beam Operation; Reno, Nevada, USA, May 13-May 17, 2019. (Year: 2019).*

3GPP TSG RAN WG1 Ad-Hoc Meeting 1901; R1-1901296; Source: CATT; Title: Consideration on multi-TRP/panel transmission; Taipei, Jan. 21-25, 2019 (Year: 2019).*

Nokia, "Enhancements on Multi-beam Operation", 3GPP TSG RAN WG1 #97, R1-1907317, Meeting Reno, Nevada, USA, May 13-May 17, 2019.

Vivo, "Further discussion on Multi-Beam Operation", 3GPP TSG RAN WG1 #97, R1-1906160, Reno, USA, May 13-17, 2019.

NTT Doco, Inc., "Discussion on multi-beam enhancement", 3GPP TSG RAN WG1 #96bis, R1-1904967, Xi'an, China, Apr. 8-12, 2019.

Huawei, "Remaining issues on beam management", 3GPP TSG RAN WG1 Meeting #93, R1-1805952, Busan, Korea, May 21-25, 2018.

Ericsson, "Feature lead summary 2 on beam measurement and reporting", 3GPP TSG RAN WG1 Meeting #92b R1-1805574, Sanya, China, Apr. 16-20, 2018.

Ericsson, "Unification of EN-DC terminology", 3GPP TSG-RAN2 Meeting #105, R2-1901712, Athens, Greece, Feb 25-Mar. 1, 2018.

* cited by examiner

PARAMETER DETERMINING METHOD, INFORMATION CONFIGURATION METHOD, AND DEVICE

CROSS-REFERENCE TO RELATED APPLICATIONS

The present application is a continuation application of International Application No. PCT/CN2020/102801 filed on Jul. 17, 2020, which claims priority to Chinese Patent Application No. 201910657436.0, filed on Jul. 19, 2019 and entitled "PARAMETER DETERMINING METHOD, INFORMATION CONFIGURATION METHOD, AND DEVICE", which are incorporated herein by reference in their entirety.

TECHNICAL FIELD

This disclosure belongs to the field of communications technologies, and in particular, to a parameter determining method, an information configuration method, and a device.

BACKGROUND

In a fifth generation (5G) mobile communications system, after user equipment (UE) receives a physical downlink shared channel (PDSCH), it needs to use a physical uplink control channel (PUCCH) resource configured by a network device, to feed back hybrid automatic repeat request acknowledgment (HARQ-ACK) information to the network device. In addition, before using the PUCCH resource to feed back the HARQ-ACK information, the user equipment also needs to determine related parameters of the PUCCH resource, such as spatial relation information (used to represent beam information of the PUCCH) and a power control parameter of the PUCCH, and use such related parameters to feed back the HARQ-ACK on the PUCCH resource.

However, in a case that the network device has not configured or activated one or more related parameters for the PUCCH resource, it is still unclear about how the UE determines a target parameter used in transmitting a PUCCH on the PUCCH resource.

SUMMARY

According to a first aspect, a parameter determining method is provided, where the method is applied to a terminal device and includes:
  in a case that a first preset condition is met, determining, based on parameter information of a specified object, a target parameter used in transmitting a PUCCH on a target PUCCH resource; where
  the specified object includes one of a specified resource, a specified channel, and a specified signal, and the target parameter includes at least one of spatial relation information and a power control parameter.

According to a second aspect, an information configuration method is provided, where the method is applied to a network device and includes:
  transmitting first information to a terminal device; wherein
  the first information is used by the terminal device to determine a PUCCH resource group to which a target PUCCH resource belongs.

According to a third aspect, a terminal device is provided, where the terminal device includes:
  a first parameter determining module, configured to: in a case that a first preset condition is met, determine, based on parameter information of a specified object, a target parameter used in transmitting a PUCCH on a target PUCCH resource; where
  the specified object includes one of a specified resource, a specified channel, and a specified signal, and the target parameter includes at least one of spatial relation information and a power control parameter.

According to a fourth aspect, a network device is provided, where the network device includes:
  a first transmitting module, configured to transmit first information to a terminal device, where
  the first information is used by the terminal device to determine a PUCCH resource group to which a target PUCCH resource belongs.

According to a fifth aspect, a terminal device is provided, where the terminal device includes a memory, a processor, and a wireless communications program stored in the memory and capable of running on the processor, and when the wireless communications program is executed by the processor, the steps of the method according to the first aspect are implemented.

According to a sixth aspect, a network device is provided, where the network device includes a memory, a processor, and a wireless communications program stored in the memory and capable of running on the processor, and when the wireless communications program is executed by the processor, the steps of the method according to the second aspect are implemented.

According to a seventh aspect, a computer-readable medium is provided, where a wireless communications program is stored in the computer-readable medium, and when the wireless communications program is executed by a processor, the steps of the method according to the first aspect or the second aspect are implemented.

According to an eighth aspect, a computer program product is provided, where when a computer runs instructions of the computer program product, the computer executes the method according to the first aspect or the second aspect.

BRIEF DESCRIPTION OF DRAWINGS

The features, advantages, and technical effects of the example embodiments of this disclosure will be described below with reference to the accompanying drawings.

DESCRIPTION OF EMBODIMENTS

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

It should be understood that, the technical solutions in the embodiments of this disclosure may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5G system or a new radio (NR) system.

UE is also referred to as a mobile terminal, a mobile terminal device, and the like, and may communicate with at least one core network through a radio access network (for example, radio access network (RAN)). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for configuring information. The network device may be a base station, and the base station may be a base station (BTS) in GSM or CDMA, may be a NodeB in WCDMA, or may be an evolved NodeB (evolutional Node B, eNB or e-NodeB) in LTE, a 5G NodeB (gNB), or a network-side device in a subsequent evolved communications system. However, the terms used do not constitute any limitation on the protection scope of this disclosure.

It should be noted that, in the description of specific embodiments, sequence numbers of processes do not mean execution sequences, and the execution sequences of the processes should be determined according to functions and internal logic of the processes, and should not be construed as any limitation on the implementation processes in the embodiments of this disclosure.

It should be noted that a parameter determining method provided in the embodiments of this disclosure may be applied to a case in which a network device has configured one or more target parameters for a PUCCH resource, and may also be applied to a case in which the network device has not configured a target parameter for the PUCCH resource.

Figure 1:
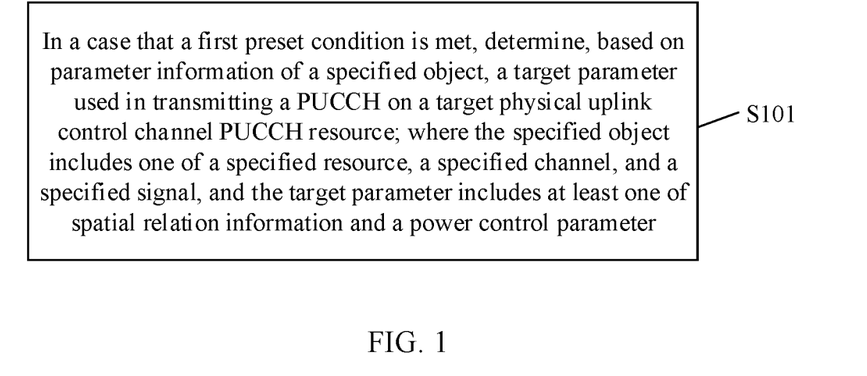
FIG. 1 is a first schematic flowchart of a parameter determining method according to an embodiment of this disclosure.

As shown in FIG. 1, an embodiment of this disclosure provides a parameter determining method that may be applied to a terminal device. The method may include the following step.

Step 101. In a case that a first preset condition is met, determine, based on parameter information of a specified object, a target parameter used in transmitting a PUCCH on a target PUCCH resource.

The specified object includes one of a specified resource (such as a CORESET), a specified channel (such as a specified downlink channel PDCCH), and a specified signal (such as a specified reference signal), and the target parameter includes at least one of spatial relation information and a power control parameter.

The target PUCCH resource may be any PUCCH resource configured by a network device for the terminal device. The target parameter includes but is not limited to at least one of spatial relation information and a power control parameter. The power control parameter may include but is not limited to a pathloss reference signal (pathloss RS).

The first preset condition includes but is not limited to one of the following three conditions:
1. first downlink control information (DCI) is received from one transmission reception point (TRP), where the first DCI is used to indicate transmitting the PUCCH on the target PUCCH resource;
2. multiple DCIs are received from multiple TRPs, where the multiple DCIs are used to indicate transmitting the PUCCH on the target PUCCH resource; and
3. an occasion for transmitting the PUCCH by using the target PUCCH resource is reached, where the target PUCCH resource is a periodic resource or a semi-persistent resource.

It can be understood that the foregoing three types of first preset conditions respectively correspond to three different application scenarios.

Example 1

The determining, based on parameter information of a specified object, a target parameter used in transmitting a PUCCH on a target PUCCH resource includes:
determining spatial relation information of a target object based on first target information of the specified object; and
using the spatial relation information of the target object as target spatial relation information used in transmitting the PUCCH on the target PUCCH resource, where the first target information includes one of transmission configuration indicator (TCI) state information, quasi co-location (QCL) information, and spatial relation information, and the target object includes at least one of the target PUCCH resource and a PUCCH resource group to which the target PUCCH resource belongs.

It can be understood that when the target PUCCH resource belongs to one PUCCH resource group, a determined target parameter of the PUCCH resource group is also the target parameter of the target PUCCH resource.

Example 2

The determining, based on parameter information of a specified object, a target parameter used in transmitting a PUCCH on a target PUCCH resource includes:
determining a power control parameter of a target object based on second target information of the specified object; and
using the power control parameter of the target object as a target power control parameter used in transmitting the PUCCH on the target PUCCH resource; where the second target information includes one of TCI state information, QCL information, spatial relation information, and a power control parameter, and the target object includes at least one of the target PUCCH resource and a PUCCH resource group to which the target PUCCH resource belongs.

Specifically, in example 2, the determining a power control parameter of a target object based on second target information of the specified object may include: determining a first power control parameter of the target object based on a reference signal (RS) or a source reference signal (source RS) in the second target information of the specified object, where the first power control parameter is a pathloss RS. For example, a pathloss RS of the target PUCCH resource or the PUCCH resource group is determined based on the reference RS or source RS in the TCI state information, QCL information, and spatial relation information of the specified object.

Optionally, in example 2, the determining a power control parameter of a target object based on second target information of the specified object may include: in a case that a second preset condition is met, determining a first power control parameter of the target object based on a reference signal or a source reference signal in the second target information of the specified object.

The second preset condition includes one of the following conditions:

(1) A network device has not configured the spatial relation information of the target object for the terminal device, and the network device has configured the first power control parameter of the target object for the terminal device.

The first power control parameter generally depends on the spatial relation information. Therefore, in a case that the network device has not configured the spatial relation information of the target object for the terminal device, even if the network device has configured the first power control parameter of the target object for the terminal device, the first power control parameter of the target object still needs to be determined based on the reference signal or source reference signal in the second target information of the specified object.

(2) A network device has not configured the spatial relation information and first power control parameter of the target object for the terminal device.

(3) A network device has configured the spatial relation information of the target object for the terminal device, and the network device has not configured the first power control parameter of the target object for the terminal device.

Certainly, even if the network device has configured the spatial relation information and first power control parameter of the target object for the terminal device, the first power control parameter of the target object may also be re-determined based on the reference signal or source reference signal in the second target information of the specified object.

Optionally, on the basis of example 2, the method shown in FIG. 1 may further include:

determining that a second power control parameter of the target object is a preset value, where the second power control parameter is a power control parameter other than the first power control parameter.

In other words, any power control parameter other than the pathloss RS may use a default value. For example, the power control parameter may be p0-PUCCH-Id, and using a default value means setting an ID of p0-PUCCH-Id to a specific index (ID) value, such as a minimum ID value, or a latest valid ID value (such as an ID value most recently indicated by a media access control control element (MAC CE)).

The following describes the specified object in each of the foregoing three application scenarios.

In a first application scenario, that is, when the first preset condition includes that first DCI is received from one transmission reception point TRP, where the first DCI is used to indicate transmitting the PUCCH on the target PUCCH resource, the specified object includes one of the following objects:

(1) A channel in which the first DCI is located.

To be specific, the target spatial relation information used in transmitting the PUCCH on the target PUCCH resource may be determined by using one of TCI state information, QCL information, and spatial relation information of a PDCCH in which the first DCI is located; and/or the target power control parameter used in transmitting the PUCCH on the target PUCCH resource may be determined by using one of TCI state information, QCL information, spatial relation information, and a power control parameter of a PDCCH in which the first DCI is located.

(2) A control resource set in which the first DCI is located.

To be specific, the target spatial relation information used in transmitting the PUCCH on the target PUCCH resource may be determined by using one of TCI state information, QCL information, and spatial relation information of a control resource set (CORESET) in which the first DCI is located; and/or the target power control parameter used in transmitting the PUCCH on the target PUCCH resource may be determined by using one of TCI state information, QCL information, spatial relation information, and a power control parameter of a control resource set (CORESET) in which the first DCI is located.

(3) One of a specified resource, a specified channel, and a specified signal that correspond to the TRP.

To be specific, the target spatial relation information used in transmitting the PUCCH on the target PUCCH resource may be determined by using one of TCI state information, QCL information, and spatial relation information of one of a specified resource (such as a specified CORESET), a specified channel (such as a specified PDCCH), and a specified signal (such as a specified reference signal) that correspond to the TRP and in which the first DCI is located; and/or the target power control parameter used in transmitting the PUCCH on the target PUCCH resource may be determined by using one of TCI state information, QCL information, spatial relation information, and a power control parameter of one of a specified resource, a specified channel, and a specified signal that correspond to the TRP and in which the first DCI is located.

Specifically, the specified object includes a control resource set having a specified index value and corresponding to the TRP. For example, a control resource set having a specified index value (CORESET id) in the control resource set that corresponds to the TRP and in which the first DCI is located may be used. The specified index value may include: at least one of a largest index value, a smallest index value, and an index value 0.

In a second application scenario, that is, when the first preset condition includes that multiple DCIs are received from multiple TRPs, where the multiple DCIs are used to indicate transmitting the PUCCH on the target PUCCH resource, the specified object includes one of the following objects:

(1) The specified object is a specified control resource set, where the specified control resource set is a control resource set whose index value meets a third preset condition in the multiple control resource sets in which the multiple DCIs are located.

The third preset condition may include one of the following: an index value of the control resource set being the largest, an index value of the control resource set being the smallest, and an index value of the control resource set being a specified value.

To be specific, the target spatial relation information used in transmitting the PUCCH on the target PUCCH resource may be determined by using one of TCI state information, QCL information, and spatial relation information of a default control resource set in the different control resource sets in which the multiple DCIs are located; and/or the target power control parameter used in transmitting the PUCCH on the target PUCCH resource may be determined by using one of TCI state information, QCL information, spatial relation information, and a power control parameter of a default control resource set in the different control resource sets in which the multiple DCIs are located.

(2) The specified object is one of a specified resource, a specified channel, and a specified signal that correspond to a specified TRP, where the specified TRP is a TRP whose index value meets a fourth preset condition in the multiple TRPs.

The fourth preset condition may include one of the following: an index value of the TRP being the largest, an index value of the TRP being the smallest, and an index value of the TRP being a specified value.

It should be noted that, in the embodiments of this disclosure, one TRP can be identified by using at least one type of the following information:

a control resource set or a control resource set group;
an index value (ID), which explicitly identifies a TRP;
a TCI state, a TCI state list, or a TCI state pool;
QCL information or QCL group information;
spatial relation information or spatial relation group information;
a PDCCH scrambling identifier or a PDCCH scrambling identifier group;
a PDSCH scrambling identifier or a PDSCH scrambling identifier group;
PDCCH configuration signaling element;
PDSCH configuration signaling element; and
a reference signal (RS) resource, an RS resource set, or the like.

For example, the specified object is one of the following specified resources corresponding to the specified TRP:

(i) A control resource set having a specified index value and corresponding to the specified TRP.

The specified index value may be one of a largest index value, a smallest index value, and a specified index value. For example, if the control resource sets of the specified TRP include CORESET 1 and CORESET 2, and the specified index value is the smallest index value, CORESET 1 may be used as the specified object.

Correspondingly, the target spatial relation information used in transmitting the PUCCH on the target PUCCH resource may be determined by using one of TCI state information, QCL information, and spatial relation information of CORESET 1; and/or the target power control parameter used in transmitting the PUCCH on the target PUCCH resource may be determined by using one of TCI state information, QCL information, spatial relation information, and a power control parameter of CORESET 1.

(ii) A control resource set that corresponds to the specified TRP and in which target DCI is located, where the target DCI is a DCI, in the multiple DCIs, that is transmitted by the specified TRP.

For example, if multiple DCIs are transmitted by TRP1 and TRP2 respectively, target DCI is the DCI transmitted by TRP1, and the control resource set in which the target DCI is located is CORESET 3 of TRP1, CORESET 3 may be used as the specified object.

Correspondingly, the target spatial relation information used in transmitting the PUCCH on the target PUCCH resource may be determined by using one of TCI state information, QCL information, and spatial relation information of CORESET 3; and/or the target power control parameter used in transmitting the PUCCH on the target PUCCH resource may be determined by using one of TCI state information, QCL information, spatial relation information, and a power control parameter of CORESET 3.

(3) The specified object is one of a specified resource, a specified channel, and a specified signal that correspond to a specified control resource set group, where the specified control resource set group is a control resource set group whose index value meets a fifth preset condition in multiple control resource set groups in which the multiple DCIs are located.

The fifth preset condition includes one of the following: an index value of the control resource set being the largest, an index value of the control resource set being the smallest, and an index value of the control resource set being a specified value. For example, the specified object is one of the following specified resources corresponding to the specified control resource set group:

(i) A control resource set having a specified index value in the specified control resource set group.

The specified index value may be one of a largest index value, a smallest index value, and a specified index value. For example, if the control resource sets included in the specified control resource set group are CORESET 1, CORESET 2, and CORESET 4, and the specified index value is the largest index value, CORESET 4 may be used as the specified object.

Correspondingly, the target spatial relation information used in transmitting the PUCCH on the target PUCCH resource may be determined by using one of TCI state information, QCL information, and spatial relation information of CORESET 4; and/or the target power control parameter used in transmitting the PUCCH on the target PUCCH resource may be determined by using one of TCI state information, QCL information, spatial relation information, and a power control parameter of CORESET 4.

(ii) A control resource set in which target DCI is located in the specified control resource set group, where the target DCI is a DCI, in the multiple DCIs, that is transmitted on a control resource set in the specified control resource set group.

For example, if the control resource sets included in the specified control resource set group are CORESET 3, CORESET 4, and CORESET 5, and the target DCI in the multiple DCIs is transmitted on CORESET 5 in the specified control resource set group, CORESET 5 may be used as the specified object.

Correspondingly, the target spatial relation information used in transmitting the PUCCH on the target PUCCH resource may be determined by using one of TCI state information, QCL information, and spatial relation information of CORESET 5; and/or the target power control parameter used in transmitting the PUCCH on the target PUCCH resource may be determined by using one of TCI state information, QCL information, spatial relation information, and a power control parameter of CORESET 5.

In a third application scenario, that is, when an occasion for transmitting the PUCCH by using the target PUCCH resource is reached, and the target PUCCH resource is a periodic resource or a semi-persistent resource, the specified object includes one of the following objects:

(1) A most recent transmission.

Specifically, the target spatial relation information used in transmitting the PUCCH on the target PUCCH resource may be determined by using one of TCI state information, QCL information, and spatial relation information of the most recent transmission; and/or the target power control parameter used in transmitting the PUCCH on the target PUCCH resource may be determined by using one of TCI state information, QCL information, spatial relation information, and a power control parameter of the most recent transmission.

(2) One of a specified resource, a specified channel, and a specified signal of a TRP corresponding to a most recent transmission.

For example, the specified object is a control resource set having a specified index value in a control resource set of a TRP corresponding to a most recent transmission. The specified index value may include but is not limited to one of a largest index value, a smallest index value, and a specified index value.

Specifically, the target spatial relation information used in transmitting the PUCCH on the target PUCCH resource may be determined by using one of TCI state information, QCL information, and spatial relation information of a control resource set having a specified index value in a control resource set of a TRP corresponding to a most recent transmission; and/or the target power control parameter used in transmitting the PUCCH on the target PUCCH resource may be determined by using one of TCI state information, QCL information, spatial relation information, and a power control parameter of a control resource set having a specified index value in a control resource set of a TRP corresponding to a most recent transmission.

(3) One of a specified resource, a specified channel, and a specified signal that correspond to a control resource set group corresponding to a most recent transmission.

For example, the specified object is a control resource set having a specified index value in a control resource set group corresponding to the most recent transmission. The specified index value may include but is not limited to one of a largest index value, a smallest index value, and a specified index value.

Specifically, the target spatial relation information used in transmitting the PUCCH on the target PUCCH resource may be determined by using one of TCI state information, QCL information, and spatial relation information of a control resource set having a specified index value in a control resource set group corresponding to a most recent transmission; and/or the target power control parameter used in transmitting the PUCCH on the target PUCCH resource may be determined by using one of TCI state information, QCL information, spatial relation information, and a power control parameter of a control resource set having a specified index value in a control resource set group corresponding to a most recent transmission.

The most recent transmission may include one of any most recent transmission, any most recent downlink transmission, any most recent uplink transmission, a most recent specified channel transmission, and a most recent specified signal transmission. The any most recent transmission refers to a transmission that is closest to a current moment among all transmissions (all channels and signals) that have occurred, where the transmission may be of any type; the any most recent downlink transmission refers to a downlink transmission that is closest to a current moment among all downlink transmissions (all downlink channels and signals) that have occurred, where the downlink transmission may be of any type; the any most recent uplink transmission refers to an uplink transmission that is closest to a current moment among all uplink transmissions (all uplink channels and signals) that have occurred, where the uplink transmission may be of any type; the most recent specified channel transmission refers to a channel transmission of a specified type that is closest to a current moment among all channel transmissions that have occurred; and the most recent specified signal transmission refers to a signal transmission of a specified type that is closest to a current moment among all signal transmissions that have occurred.

Optionally, after the determining a target parameter used in transmitting a PUCCH on a target PUCCH resource, the method shown in FIG. 1 may further include:

determining a target TRP based on the target parameter; and transmitting, on the target PUCCH resource by using the target parameter, the PUCCH to the target TRP.

For example, in the foregoing first application scenario, that is, when the first preset condition includes that first DCI is received from one TRP, the target TRP is the TRP transmitting the first DCI.

For another example, in the foregoing second application scenario, that is, when the first preset condition includes that multiple DCIs are received from multiple TRPs, the target TRP is a TRP that corresponds to the target parameter in the multiple TRPs transmitting the multiple DCIs.

For still another example, in the foregoing third application scenario, that is, when the first preset condition includes that an occasion for transmitting the PUCCH by using the target PUCCH resource is reached, where the target PUCCH resource is a periodic resource or a semi-persistent resource, the target TRP is a TRP corresponding to a most recent transmission. The most recent transmission includes one of any most recent transmission, any most recent downlink transmission, any most recent uplink transmission, a most recent specified channel transmission, a most recent specified signal transmission, and the like.

In the parameter determining method provided in this embodiment of this disclosure, the target parameter used in transmitting the PUCCH on the target PUCCH resource can be determined based on the parameter information of the specified object, thereby ensuring correct transmission of the PUCCH and improving communication reliability. In addition, the terminal device can determine, based on the parameter information of the specified object, the target parameter used in transmitting the PUCCH on the target PUCCH resource, so that the network device does not need to separately configure or indicate a target parameter for each PUCCH resource, thereby reducing network resource overheads.

Figure 2:
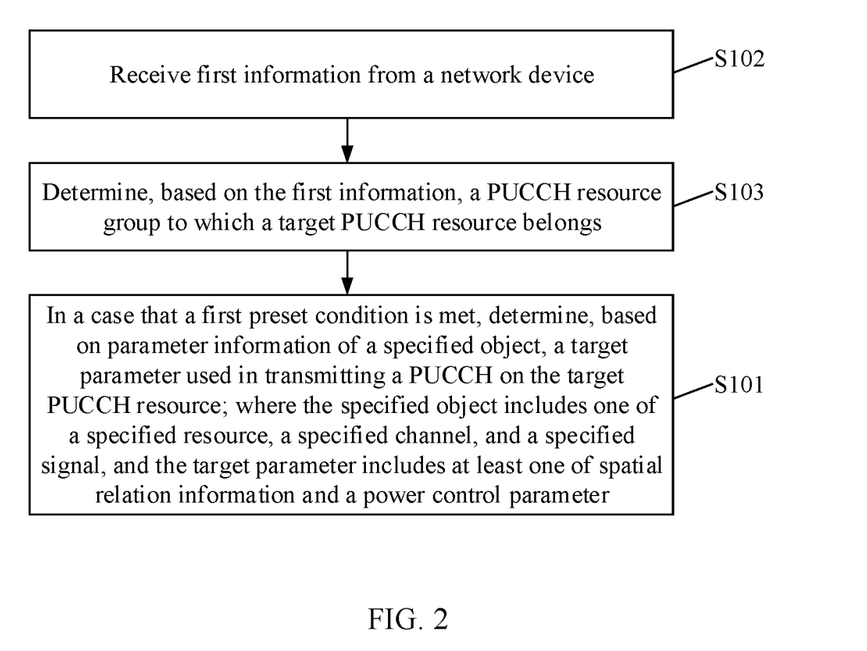
FIG. 2 is a second schematic flowchart of a parameter determining method according to an embodiment of this disclosure.

Optionally, as shown in FIG. 2, a parameter determining method provided in an embodiment of this disclosure may include the following steps before step 101.

Step 102: Receive first information from a network device.

Step 103: Determine, based on the first information, a PUCCH resource group to which a target PUCCH resource belongs.

In a first implementation of this embodiment, the first information may be radio resource control (RRC) information, the first information is used to configure the target PUCCH resource for a terminal device, the first information includes third target information, and the third target information is used to determine the PUCCH resource group to which the target PUCCH resource belongs. In other words, the target PUCCH resource may be grouped through the RRC for configuring the target PUCCH resource for the terminal device.

The third target information may include any one type of the following information:
- identification information of the PUCCH resource group to which the target PUCCH resource belongs;
- identification information of a TRP corresponding to the target PUCCH resource; and
- identification information of a control resource set group corresponding to the target PUCCH resource.

All such information may be used to represent information about the PUCCH resource group to which the target PUCCH resource belongs.

For example, a group id of the PUCCH resource group may be added to a PUCCH-config parameter in the RRC information; or a new upper-layer parameter is added for a PUCCH-config parameter to indicate a group id of the PUCCH resource group, and information about a PUCCH resource belonging to the group is indicated under the upper layer parameter. Optionally, the group id of the PUCCH resource group may alternatively be identified by a TRP id, a CORESET group id, or the like.

In a second implementation of this embodiment, the first information is RRC information, and the determining, based on the first information, a PUCCH resource group to which a target PUCCH resource belongs includes:
- determining, based on identification information of a bandwidth part (BWP) in the RRC information, the PUCCH resource group to which the target PUCCH resource belongs, where PUCCH resources on a same BWP belong to a same PUCCH resource group.

This implementation is intended to illustrate that when all PUCCH resources on one BWP are in one group, the group information of the PUCCH resource may not be explicitly configured by using the RRC information, but is determined by using the identification information of the BWP.

In a third implementation of this embodiment, the first information is one of the following first MAC CE and second MAC CE.

The first MAC CE is used to group the PUCCH resource, and the first MAC CE includes fourth target information. In a specific implementation, the first MAC CE may be an existing MAC CE, and uses any one of an existing reserved bit, a value of a bit sequence in a signaling field, and a newly added bit to indicates group information of the PUCCH resource group to which the target PUCCH resource belongs, and/or to indicate information about PUCCH resources included in the PUCCH resource group; or the first MAC CE may be a newly added MAC CE dedicated to indicating group information of the PUCCH resource group to which the target PUCCH resource belongs, and/or information about PUCCH resources included in the PUCCH resource group.

In addition, when the existing MAC CE is used as the first MAC CE, at least one particular bit (such as a reserved bit or a newly added bit) in the MAC CE may be used to explicitly indicate the group information of the target PUCCH resource; or an existing bit included in the MAC CE may be used to implicitly indicate the group information of the target PUCCH resource (for example, a value in an existing indication field is used to implicitly indicate the group information).

The second MAC CE is used to indicate parameter information of the target PUCCH resource or the PUCCH resource group to which the target PUCCH resource belongs, the parameter information may include, but is not limited to, at least one of active spatial relation information and an active power control parameter of the target PUCCH resource, and the second MAC CE includes the fourth target information. In other words, the MAC CE indicating the parameter information of the target PUCCH resource may be used to indicate the group information of the target PUCCH resource.

The fourth target information in the first MAC CE and second MAC CE is used to determine the PUCCH resource group to which the PUCCH resource belongs.

The foregoing describes the parameter determining method applied to a terminal device. The following describes an information configuration method applied to a network device provided in an embodiment of this disclosure with reference to FIG. 7.

Figure 3:
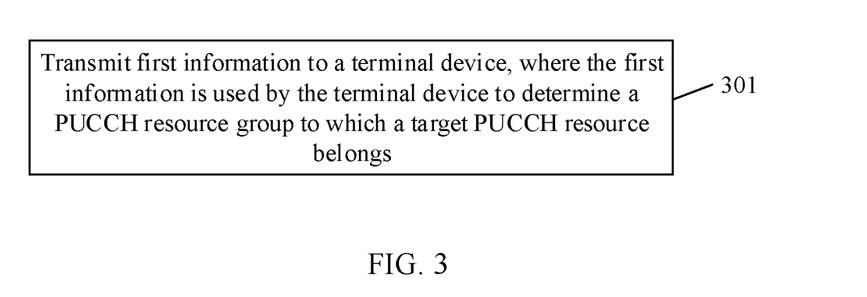
FIG. 3 is a schematic flowchart of an information configuration method according to an embodiment of this disclosure.

As shown in FIG. 3, an embodiment of this disclosure provides an information configuration method applied to a network device. The method may include the following step.

Step 301: Transmit first information to a terminal device, where the first information is used by a terminal device to determine a PUCCH resource group to which a target PUCCH resource belongs.

In a first implementation of this embodiment, the first information may be RRC information, the first information is used to configure the target PUCCH resource for the terminal device, the first information includes third target information, and the third target information is used to determine the PUCCH resource group to which the target PUCCH resource belongs. In other words, the target PUCCH resource may be grouped through the RRC for configuring the target PUCCH resource for the terminal device.

The third target information may include any one type of the following information:
- identification information of the PUCCH resource group to which the target PUCCH resource belongs;
- identification information of a TRP corresponding to the target PUCCH resource; and
- identification information of a control resource set group corresponding to the target PUCCH resource.

All such information may be used to represent information about the PUCCH resource group to which the target PUCCH resource belongs.

For example, a group id of the PUCCH resource group may be added to a PUCCH-config parameter in the RRC information; or a new upper-layer parameter is added for a PUCCH-config parameter to indicate a group id of the PUCCH resource group, and information about a PUCCH resource belonging to the group is indicated under the upper layer parameter. Optionally, the group id of the PUCCH resource group may alternatively be identified by a TRP id, a CORESET group id, or the like.

In a second implementation of this embodiment, the first information is RRC information, and identification information of a BWP in the RRC information may be used to determine the PUCCH resource group to which the target PUCCH resource belongs, where PUCCH resources on a same BWP belong to a same PUCCH resource group.

This implementation is intended to illustrate that when all PUCCH resources on one BWP are in one group, the group information of the PUCCH resource may not be explicitly configured by using the RRC information, but is determined by using the identification information of the BWP.

In a third implementation of this embodiment, the first information is one of the following first MAC CE and second MAC CE.

The first MAC CE is used to group the PUCCH resource, and the first MAC CE includes fourth target information. In a specific implementation, the first MAC CE may be an existing MAC CE, and uses any one of an existing reserved bit, a value of a bit sequence in a signaling field, and a newly added bit to indicates group information of the PUCCH resource group to which the target PUCCH resource belongs, and/or to indicate information about PUCCH resources included in the PUCCH resource group; or the first MAC CE may be a newly added MAC CE dedicated to indicating group information of the PUCCH resource group to which the target PUCCH resource belongs, and/or information about PUCCH resources included in the PUCCH resource group.

When the existing MAC CE is used as the first MAC CE, at least one particular bit (such as a reserved bit or a newly added bit) in the MAC CE may be used to explicitly indicate the group information of the target PUCCH resource; or an existing bit included in the MAC CE may be used to implicitly indicate the group information of the target PUCCH resource (for example, a value in an existing indication field is used to implicitly indicate the group information).

The second MAC CE is used to indicate parameter information of the target PUCCH resource or the PUCCH resource group to which the target PUCCH resource belongs, the parameter information may include, but is not limited to, at least one of active spatial relation information and an active power control parameter of the target PUCCH resource, and the second MAC CE includes the fourth target information. In other words, the MAC CE indicating the parameter information of the target PUCCH resource may be used to indicate the group information of the target PUCCH resource.

The fourth target information in the first MAC CE and second MAC CE is used to determine the PUCCH resource group to which the PUCCH resource belongs.

According to the information configuration method provided in this embodiment of this specification, PUCCH resources can be grouped, thereby improving management efficiency of the PUCCH resources.

Figure 4:
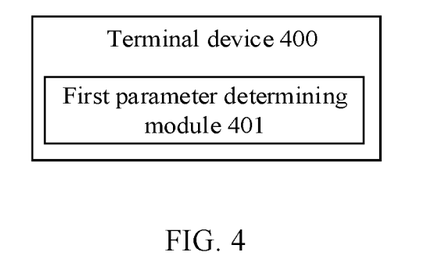
FIG. 4 is a first schematic structural diagram of a terminal device according to an embodiment of this disclosure.
Figure 5:
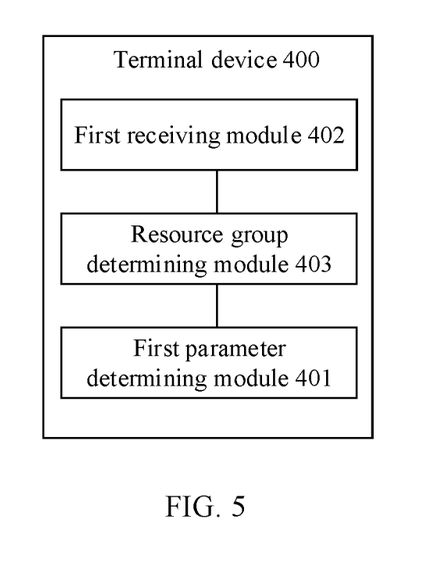
FIG. 5 is a second schematic structural diagram of a terminal device according to an embodiment of this disclosure.
Figure 6:
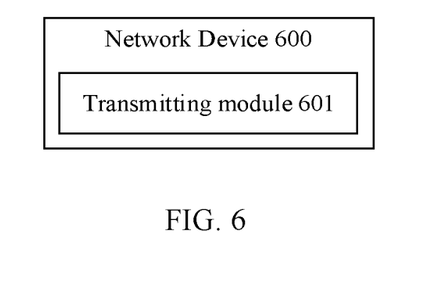
FIG. 6 is a schematic structural diagram of a network device according to an embodiment of this disclosure.

The foregoing describes the information configuration method applied to a network device, and the following describes a terminal device and a network device in the embodiments of this disclosure in detail with reference to FIG. 4 to FIG. 6.

FIG. 4 is a schematic structural diagram of a terminal device according to an embodiment of this disclosure. As shown in FIG. 4, the terminal device 400 may include a first parameter determining module 401.

The first parameter determining module 401 is configured to: in a case that a first preset condition is met, determine, based on parameter information of a specified object, a target parameter used in transmitting a PUCCH on a target PUCCH resource; where
the specified object includes one of a specified resource, a specified channel, and a specified signal, and the target parameter includes at least one of spatial relation information and a power control parameter.

The first preset condition includes but is not limited to one of the following three conditions:

1. first DCI is received from one TRP, where the first DCI is used to indicate transmitting the PUCCH on the target PUCCH resource;
2. multiple DCIs are received from multiple TRPs, where the multiple DCIs are used to indicate transmitting the PUCCH on the target PUCCH resource; and
3. an occasion for transmitting the PUCCH by using the target PUCCH resource is reached, where the target PUCCH resource is a periodic resource or a semi-persistent resource.

It can be understood that the foregoing three types of first preset conditions respectively correspond to three different application scenarios.

Example 1

The first parameter determining module 401 may be configured to:
determine spatial relation information of a target object based on first target information of the specified object; and
use the spatial relation information of the target object as target spatial relation information used in transmitting the PUCCH on the target PUCCH resource; where
the first target information includes one of TCI state information, QCL information, and spatial relation information, and the target object includes at least one of the target PUCCH resource and a PUCCH resource group to which the target PUCCH resource belongs.

Example 2

The first parameter determining module 401 may be configured to:
determine a power control parameter of a target object based on second target information of the specified object; and
use the power control parameter of the target object as a target power control parameter used in transmitting the PUCCH on the target PUCCH resource; where
the second target information includes one of TCI state information, QCL information, spatial relation information, and a power control parameter, and the target object includes at least one of the target PUCCH resource and a PUCCH resource group to which the target PUCCH resource belongs.

Specifically, in example 2, the first parameter determining module 401 may be specifically configured to determine a first power control parameter of the target object based on an RS or a source RS in the second target information of the specified object, where the first power control parameter is a pathloss RS.

Optionally, in example 2, the first parameter determining module 401 may be specifically configured to: in a case that a second preset condition is met, determine a first power control parameter of the target object based on an RS or a source RS in the second target information of the specified object.

The second preset condition includes one of the following conditions:
(1) A network device has not configured the spatial relation information of the target object for the terminal device, and the network device has configured the first power control parameter of the target object for the terminal device.

(2) A network device has not configured the spatial relation information and first power control parameter of the target object for the terminal device.
(3) A network device has configured the spatial relation information of the target object for the terminal device, and the network device has not configured the first power control parameter of the target object for the terminal device.

Optionally, on the basis of example 2, the terminal device 400 shown in FIG. 4 may further include: a second parameter determining module, configured to determine that a second power control parameter of the target object is a preset value, where the second power control parameter is a power control parameter other than the first power control parameter.

The following describes the specified object in each of the foregoing three application scenarios.

In the first application scenario, that is, when the first preset condition includes that first DCI is received from one transmission reception point TRP, where the first DCI is used to indicate transmitting the PUCCH on the target PUCCH resource, the specified object includes one of the following objects:
(1) a channel in which the first DCI is located;
(2) a control resource set in which the first DCI is located; and
(3) one of a specified resource, a specified channel, and a specified signal that correspond to the TRP.

In the second application scenario, that is, when the first preset condition includes that multiple DCIs are received from multiple TRPs, where the multiple DCIs are used to indicate transmitting the PUCCH on the target PUCCH resource, the specified object includes one of the following objects:
(1) The specified object is a specified control resource set, where the specified control resource set is a control resource set whose index value meets a third preset condition in the multiple control resource sets in which the multiple DCIs are located.

The third preset condition may include one of the following: an index value of the control resource set being the largest, an index value of the control resource set being the smallest, and an index value of the control resource set being a specified value.
(2) The specified object is one of a specified resource, a specified channel, and a specified signal that correspond to a specified TRP, where the specified TRP is a TRP whose index value meets a fourth preset condition in the multiple TRPs.

The fourth preset condition may include one of the following: an index value of the TRP being the largest, an index value of the TRP being the smallest, and an index value of the TRP being a specified value.

Specifically, the specified object is one of the following specified resources corresponding to the specified TRP:
(i) a control resource set having a specified index value and corresponding to the specified TRP, where the specified index value may be one of a largest index value, a smallest index value, and a specified index value; and
(ii) a control resource set of the specified TRP, in which target DCI is located, where the target DCI is a DCI, in the multiple DCIs, that is transmitted by the specified TRP.
(3) The specified object is one of a specified resource, a specified channel, and a specified signal that correspond to a specified control resource set group, where the specified control resource set group is a control resource set group whose index value meets a fifth preset condition in multiple control resource set groups in which the multiple DCIs are located.

The fifth preset condition includes one of the following: an index value of the control resource set being the largest, an index value of the control resource set being the smallest, and an index value of the control resource set being a specified value. Specifically, the specified object is one of the following specified resources corresponding to the specified control resource set group:
(i) a control resource set having a specified index value in a specified control resource set group, where the specified index value may be one of a largest index value, a smallest index value, and a specified index value; and
(ii) a control resource set in which target DCI is located in the specified control resource set group, where the target DCI is a DCI, in the multiple DCIs, that is transmitted on a control resource set in the specified control resource set group.

In the third application scenario, that is, when an occasion for transmitting the PUCCH by using the target PUCCH resource is reached, and the target PUCCH resource is a periodic resource or a semi-persistent resource, the specified object includes one of the following objects:
(1) a most recent transmission
(2) one of a specified resource, a specified channel, and a specified signal of a TRP corresponding to a most recent transmission For example, the specified object is a control resource set having a specified index value in a control resource set of a TRP corresponding to a most recent transmission. The specified index value may include but is not limited to one of a largest index value, a smallest index value, and a specified index value.
(3) one of a specified resource, a specified channel, and a specified signal that correspond to a control resource set group corresponding to a most recent transmission For example, the specified object is a control resource set having a specified index value in a control resource set group corresponding to the most recent transmission. The specified index value may include but is not limited to one of a largest index value, a smallest index value, and a specified index value.

The most recent transmission may include one of any most recent transmission, any most recent downlink transmission, any most recent uplink transmission, a most recent specified channel transmission, and a most recent specified signal transmission.

Optionally, after the target parameter used in transmitting the PUCCH on the target PUCCH resource is determined, the terminal device 400 shown in FIG. 4 may further include:
a target TRP determining module, configured to determine a target TRP based on the target parameter; and
a PUCCH transmission module, configured to transmit, on the target PUCCH resource by using the target parameter, the PUCCH to the target TRP.

In the foregoing first application scenario, that is, when the first preset condition includes that first DCI is received from one TRP, the target TRP is the TRP transmitting the first DCI.

For another example, in the foregoing second application scenario, that is, when the first preset condition includes that multiple DCIs are received from multiple TRPs, the target TRP is a TRP that corresponds to the target parameter in the multiple TRPs transmitting the multiple DCIs.

For still another example, in the foregoing third application scenario, that is, when the first preset condition includes that an occasion for transmitting the PUCCH by using the target PUCCH resource is reached, where the target PUCCH resource is a periodic resource or a semi-persistent resource, the target TRP is a TRP corresponding to a most recent transmission. The most recent transmission includes one of any most recent transmission, any most recent downlink transmission, any most recent uplink transmission, a most recent specified channel transmission, a most recent specified signal transmission, and the like.

The terminal device 400 provided in this embodiment of this disclosure can determine, based on the parameter information of the specified object, the target parameter used in transmitting the PUCCH on the target PUCCH resource, thereby ensuring correct transmission of the PUCCH and improving communication reliability. In addition, the terminal device can determine, based on the parameter information of the specified object, the target parameter used in transmitting the PUCCH on the target PUCCH resource, so that the network device does not need to separately configure or indicate a target parameter for each PUCCH resource, thereby reducing network resource overheads.

Optionally, as shown in FIG. 5, the terminal device 400 provided in this embodiment of this disclosure may further include:

a first receiving module 402, configured to receive first information from a network device before the target parameter used in transmitting a PUCCH on a target PUCCH resource is determined based on the parameter information of the specified object; and a resource group determining module 403, configured to determine, based on the first information, a PUCCH resource group to which a target PUCCH resource belongs.

In a first implementation of this embodiment, the first information may be RRC information, the first information is used to configure the target PUCCH resource for the terminal device, the first information includes third target information, and the third target information is used to determine the PUCCH resource group to which the target PUCCH resource belongs.

The third target information may include any one type of the following information:

identification information of the PUCCH resource group to which the target PUCCH resource belongs;

identification information of a TRP corresponding to the target PUCCH resource; and identification information of a control resource set group corresponding to the target PUCCH resource.

All such information may be used to represent information about the PUCCH resource group to which the target PUCCH resource belongs.

In a second implementation of this embodiment, the first information is RRC information, and identification information of a BWP in the RRC information may be used to determine the PUCCH resource group to which the target PUCCH resource belongs, where PUCCH resources on a same BWP belong to a same PUCCH resource group.

This implementation is intended to illustrate that when all PUCCH resources on one BWP are in one group, the group information of the PUCCH resource may not be explicitly configured by using the RRC information, but is determined by using the identification information of the BWP.

In a third implementation of this embodiment, the first information is one of the following first MAC CE and second MAC CE.

The first MAC CE is used to group the PUCCH resource, and the first MAC CE includes fourth target information. The second MAC CE is used to indicate parameter information of the target PUCCH resource or the PUCCH resource group to which the target PUCCH resource belongs, the parameter information may include, but is not limited to, at least one of active spatial relation information and an active power control parameter of the target PUCCH resource, and the second MAC CE includes the fourth target information. The fourth target information in the first MAC CE and second MAC CE is used to determine the PUCCH resource group to which the PUCCH resource belongs.

The terminal device 400 shown in FIG. 4 may be configured to implement the embodiments of the parameter determining method shown in FIG. 1. For related details, refer to the foregoing method embodiments.

The foregoing describes the terminal device 400. The following describes a network device 600 provided in an embodiment of this disclosure with reference to FIG. 6.

FIG. 6 is a schematic structural diagram of a network device according to an embodiment of this disclosure. As shown in FIG. 6, the network device 600 may include: a transmitting module 601.

The transmitting module 601 is configured to transmit first information to a terminal device, where the first information is used by a terminal device to determine a PUCCH resource group to which a target PUCCH resource belongs.

In a first implementation of this embodiment, the first information may be RRC information, the first information is used to configure the target PUCCH resource for the terminal device, the first information includes third target information, and the third target information is used to determine the PUCCH resource group to which the target PUCCH resource belongs. In other words, the target PUCCH resource may be grouped through the RRC for configuring the target PUCCH resource for the terminal device.

The third target information may include any one type of the following information:

identification information of the PUCCH resource group to which the target PUCCH resource belongs;

identification information of a TRP corresponding to the target PUCCH resource; and identification information of a control resource set group corresponding to the target PUCCH resource.

All such information may be used to represent information about the PUCCH resource group to which the target PUCCH resource belongs.

In a second implementation of this embodiment, the first information is RRC information, and identification information of a BWP in the RRC information may be used to determine the PUCCH resource group to which the target PUCCH resource belongs, where PUCCH resources on a same BWP belong to a same PUCCH resource group.

In a third implementation of this embodiment, the first information is one of the following first MAC CE and second MAC CE.

The first MAC CE is used to group the PUCCH resource, and the first MAC CE includes fourth target information. The second MAC CE is used to indicate parameter information of the target PUCCH resource or the PUCCH resource group to which the target PUCCH resource belongs, the parameter information may include, but is not limited to, at least one of active spatial relation information and an active power control parameter of the target PUCCH resource, and the second MAC CE includes the fourth target information. The fourth target information is used to determine a PUCCH resource group to which the PUCCH resource belongs.

According to the information configuration method provided in this embodiment of this specification, PUCCH resources can be grouped, thereby improving management efficiency of the PUCCH resources.

The network device 600 shown in FIG. 6 may be configured to implement the embodiments of the information configuration method shown in FIG. 3. For related details, refer to the foregoing method embodiments.

Figure 7:
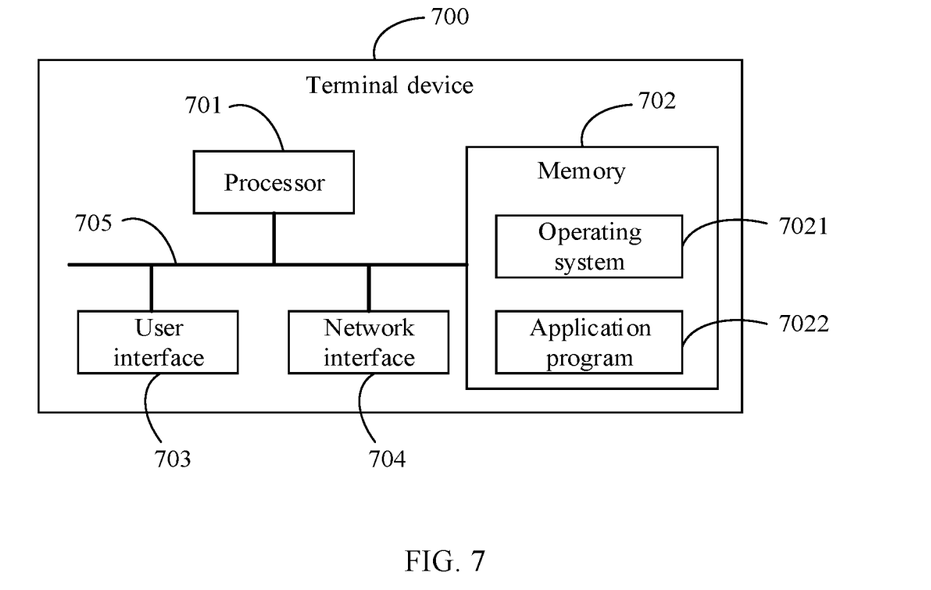
FIG. 7 is a schematic structural diagram of a terminal device according to an embodiment of this disclosure.

FIG. 7 is a schematic structural diagram of a terminal device according to another embodiment of this disclosure. The terminal device 700 shown in FIG. 7 includes at least one processor 701, a memory 702, at least one network interface 704, and a user interface 703. The components in the terminal device 700 are coupled together through a bus system 705. It can be understood that the bus system 705 is configured to implement connection and communication between these components. In addition to a data bus, the bus system 705 further includes a power bus, a control bus, and a status signal bus. However, for clarity of description, various buses are marked as the bus system 705 in FIG. 7.

The user interface 703 may include a display, a keyboard, a click device (for example, a mouse or a trackball), a touch board, a touchscreen, or the like.

It can be understood that the memory 702 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 702 of the system and the method described in the embodiments of this disclosure is intended to include but not limited to these and any other applicable types of memories.

In some implementations, the memory 702 stores the following elements: executable modules or data structures, or a subset thereof, or an extended set thereof: an operating system 7021 and an application program 7022.

The operating system 7021 includes various system programs, such as a framework layer, a core library layer, and a driver layer, for implementing various basic services and processing hardware-based tasks. The application program 7022 includes various application programs, such as a media player and a browser, which are used to implement various application services. A program for implementing the method in the embodiments of this disclosure may be included in the application program 7022.

In this embodiment of this disclosure, the terminal device 700 further includes: a computer program stored in the memory 702 and capable of running on the processor 701. When the computer program is executed by the processor 701, the processes of the foregoing parameter determining methods are implemented, with the same technical effects achieved. To avoid repetition, details are not described herein again.

The methods disclosed in the foregoing embodiments of this disclosure may be applied to the processor 701, or may be implemented by the processor 701. The processor 701 may be an integrated circuit chip with a signal processing capability. In an implementation process, the steps of the methods may be implemented by an integrated logical circuit of hardware in the processor 701, or by a software instruction. The foregoing processor 701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 701 may implement or execute the methods, steps, and logical block diagrams disclosed in the embodiments of this disclosure. The general-purpose processor may be a microprocessor, or the processor may be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory or electrically erasable programmable memory, or a register. The computer-readable storage medium is located in the memory 702, and the processor 701 fetches information in the memory 702, and completes the steps of the foregoing method in combination with its hardware. Specifically, the computer-readable storage medium stores a computer program, and when the computer program is executed by the processor 701, the steps in the foregoing parameter determining method embodiment are implemented.

Figure 8:
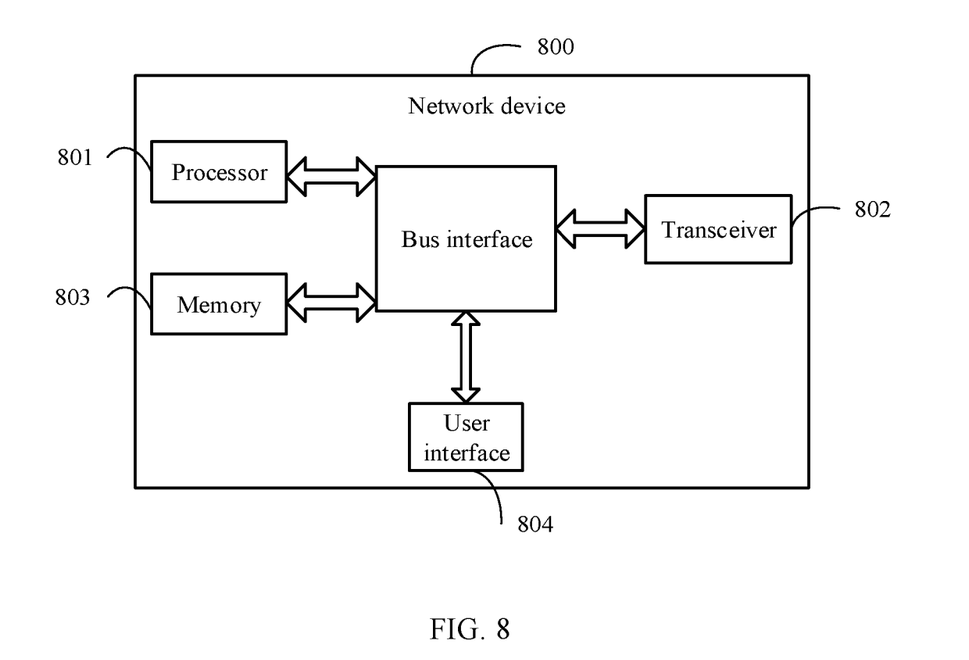
FIG. 8 is a schematic structural diagram of a network device according to an embodiment of this disclosure.

Referring to FIG. 8, FIG. 8 is a structural diagram of a network device according to an embodiment of this disclosure. The network device is capable of implementing details of the foregoing information configuration method, with the same effects achieved. As shown in FIG. 8, the network device 800 includes a processor 801, a transceiver 802, a memory 803, a user interface 804, and a bus interface.

In some embodiments of this disclosure, the network device 800 further includes: a computer program stored in the memory 803 and capable of running on the processor 801. When the computer program is executed by the processor 801, the processes of the foregoing information configuration method are implemented, with the same technical effects achieved. To avoid repetition, details are not described herein again.

In FIG. 8, a bus architecture may include any quantity of interconnected buses and bridges, and specifically connects together circuits of at least one processor represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, that is, the transceiver 602 includes a transmitter and a receiver, and provides a unit for communicating with various other apparatuses on a transmission medium. For different terminal devices, the user interface 804 may also be an interface that can be externally or internally connected to a required device. The connected device includes but is not limited to a keypad, a display, a speaker, a microphone, a joystick, and the like.

The processor 801 is responsible for management of the bus architecture and general processing, and the memory 803 may store data for use by the processor 801 when the processor 801 performs an operation.

It may be understood that the embodiments described in the embodiments of this disclosure may be implemented by hardware, software, firmware, middleware, microcode, or a combination thereof. In implementation by hardware, a processing unit may be implemented in at least one ASIC, a digital signal processor (DSP), a digital signal processing device (DSPD), a programmable logic device (PLD), an FPGA, a general-purpose processor, a controller, a microcontroller, a microprocessor, other electronic units used to implement the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

An embodiment of this disclosure further provides a computer-readable storage medium, where a computer program is stored in the computer-readable storage medium. When the computer program is executed by a processor, the processes of the foregoing parameter determining method or information configuration method embodiments are implemented, with the same technical effects achieved. To avoid repetition, details are not described herein again. For example, the computer-readable storage medium includes a non-transitory computer-readable storage medium, such as a ROM, a RAM, a magnetic disc, or an optical disc.

An embodiment of this disclosure further provides a computer program product including instructions. When a computer runs the instructions of the computer program product, the computer executes the foregoing parameter determining method or the foregoing information configuration method. Specifically, the computer program product can be run on the foregoing network device.

A person of ordinary skill in the art may be aware that the units, modules, and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, module, and unit, reference may be made to a corresponding process in the foregoing method embodiments, and details are not described again herein. The flowcharts and block diagrams in the accompanying drawings show the possible implementation architecture, functions, and operations of the systems, methods, and computer program products according to the embodiments of this disclosure. Each block in the flowcharts or block diagrams may represent a module, a segment, or a part of code, and the module, the segment, or the part of code contains one or more executable instructions used to implement (one or more) specified logical functions.

In the several embodiments provided in this disclosure, it should be understood that the disclosed system, apparatus, and method may be implemented in other manners. For example, the described apparatus embodiment is merely an example. For example, the module and unit division is merely logical function division and may be other division in actual implementation. For example, multiple modules, units, or components may be combined or integrated into another system, or some features may be ignored or may not be performed. In addition, the displayed or discussed mutual couplings or direct couplings or communications connections may be implemented by using some interfaces. The indirect couplings or communications connections between the apparatuses, modules, or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A parameter determining method, wherein the method comprises:
   determining by a terminal device, based on parameter information of a specified resource, spatial relation information and a power control parameter used in transmitting a PUCCH (physical uplink control channel) on a target PUCCH resource;
   the determining by the terminal device, based on the parameter information of the specified resource, the spatial relation information and the power control parameter used in transmitting the PUCCH on the target PUCCH resource comprises:

determining, by the terminal device, spatial relation information of a PUCCH resource group to which the target PUCCH resource belongs based on first target information of the specified resource; and using, by the terminal device, the spatial relation information of the PUCCH resource group to which the target PUCCH resource belongs as target spatial relation information used in transmitting the PUCCH on the target PUCCH resource;

determining, by the terminal device, power control parameter of the PUCCH resource group to which the target PUCCH resource belongs based on second target information of the specified resource; and using, by the terminal device, the power control parameter of the PUCCH resource group to which the target PUCCH resource belongs as a target power control parameter used in transmitting the PUCCH on the target PUCCH resource, wherein the specified resource comprises one of the following: a most recent transmission;

a specified resource of a transmission reception point (TRP) corresponding to a most recent transmission; and a specified resource that corresponds to a control resource set group corresponding to the most recent transmission;

wherein the specified resource is a control resource set having a specified index value in the control resource set of the TRP corresponding to the most recent transmission;

or, wherein the specified resource is a control resource set having a specified index value in the control resource set group corresponding to the most recent transmission.

2. The method according to claim 1, wherein the determining by the terminal device the power control parameter of the PUCCH resource group to which the target PUCCH resource belongs based on the second target information of the specified resource comprises:

determining, by the terminal device, a first power control parameter of the PUCCH resource group to which the target PUCCH resource belongs based on a reference signal or a source reference signal in the second target information of the specified resource, wherein the first power control parameter is a pathloss reference signal.

3. The method according to claim 2, wherein the determining by the terminal device the power control parameter of the PUCCH resource group to which the target PUCCH resource belongs based on the second target information of the specified resource further comprises:

determining, by the terminal device, that a second power control parameter of the PUCCH resource group to which the target PUCCH resource belongs is a preset value, wherein the second power control parameter is a power control parameter other than the first power control parameter.

4. The method according to claim 2, wherein the determining by the terminal device the first power control parameter of the PUCCH resource group to which the target PUCCH resource belongs based on the reference signal or the source reference signal in the second target information of the specified resource comprises:

in a case that a preset condition is met, determining by the terminal device the first power control parameter of the PUCCH resource group to which the target PUCCH resource belongs based on the reference signal or source reference signal in the second target information of the specified resource, wherein the preset condition comprises that a network device has not configured the spatial relation information of the PUCCH resource group to which the target PUCCH resource belongs for the terminal device, and the network device has configured the first power control parameter of the PUCCH resource group to which the target PUCCH resource belongs for the terminal device; or the preset condition comprises that a network device has not configured the spatial relation information and the first power control parameter of the PUCCH resource group to which the target PUCCH resource belongs for the terminal device; or the preset condition comprises that a network device has configured the spatial relation information of the PUCCH resource group to which the target PUCCH resource belongs for the terminal device, and the network device has not configured the first power control parameter of the PUCCH resource group to which the target PUCCH resource belongs for the terminal device.

5. The method according to claim 4, wherein the determining by the terminal device the power control parameter of the PUCCH resource group to which the target PUCCH resource belongs based on the second target information of the specified resource further comprises:

determining, by the terminal device, that a second power control parameter of the PUCCH resource group to which the target PUCCH resource belongs is a preset value, wherein the second power control parameter is a power control parameter other than the first power control parameter.

6. The method according to claim 1, wherein the most recent transmission comprises one of any most recent transmission, any most recent downlink transmission, any most recent uplink transmission, a most recent specified channel transmission, and a most recent specified signal transmission.

7. The method according to claim 1, wherein before the determining, based on the parameter information of the specified resource, the spatial relation information and the power control parameter used in transmitting a PUCCH on a target PUCCH resource, the method further comprises:

receiving, by the terminal device, first information from the network device; and determining, by the terminal device, based on the first information, the PUCCH resource group to which the target PUCCH resource belongs.

8. The method according to claim 7, wherein the first information is radio resource control RRC information, the first information is used to configure the target PUCCH resource for the terminal device, and the first information comprises third target information, wherein the third target information is used to determine the PUCCH resource group to which the target PUCCH resource belongs;

or, the first information is the RRC information, and the determining, based on the first information, the PUCCH resource group to which the target PUCCH resource belongs comprises:

determining, based on identification information of a bandwidth part (BWP) in the RRC information, the PUCCH resource group to which the target PUCCH resource belongs, wherein PUCCH resources on a same BWP belong to a same PUCCH resource group;

or, the first information is one of the following information:
a first media access control control element (MAC CE), wherein the first MAC CE is used to group a PUCCH resource, and the first MAC CE comprises fourth target information; and
a second MAC CE, wherein the second MAC CE is used to indicate parameter information of the target PUCCH resource or the PUCCH resource group to which the target PUCCH resource belongs, and the second MAC CE comprises the fourth target information; wherein
the fourth target information is used to determine a PUCCH resource group to which the PUCCH resource belongs.

9. A terminal device, comprising a memory, a processor, and a wireless communications program stored in the memory and running on the processor, wherein when the wireless communications program is executed by the processor, the following steps are implemented:
determining, based on parameter information of a specified resource, spatial relation information and a power control parameter used in transmitting a PUCCH (physical uplink control channel) on a target PUCCH resource;
the determining, based on the parameter information of the specified resource, the spatial relation information and the power control parameter used in transmitting the PUCCH on the target PUCCH resource comprises:
determining spatial relation information of a PUCCH resource group to which the target PUCCH resource belongs based on first target information of the specified resource; and using the spatial relation information of the PUCCH resource group to which the target PUCCH resource belongs as target spatial relation information used in transmitting the PUCCH on the target PUCCH resource;
determining power control parameter of the PUCCH resource group to which the target PUCCH resource belongs based on second target information of the specified resource; and using the power control parameter of the PUCCH resource group to which the target PUCCH resource belongs as a target power control parameter used in transmitting the PUCCH on the target PUCCH resource,
wherein the specified resource comprises one of the following: a most recent transmission;
a specified resource of a transmission reception point (TRP) corresponding to a most recent transmission; and
a specified resource that corresponds to a control resource set group corresponding to the most recent transmission;
wherein
the specified resource is a control resource set having a specified index value in the control resource set of the TRP corresponding to the most recent transmission;
or, wherein
the specified resource is a control resource set having a specified index value in the control resource set group corresponding to the most recent transmission.

* * * * *